March 21, 1950     D. W. EXNER     2,500,939
PROTECTIVE SYSTEM
Filed April 16, 1945
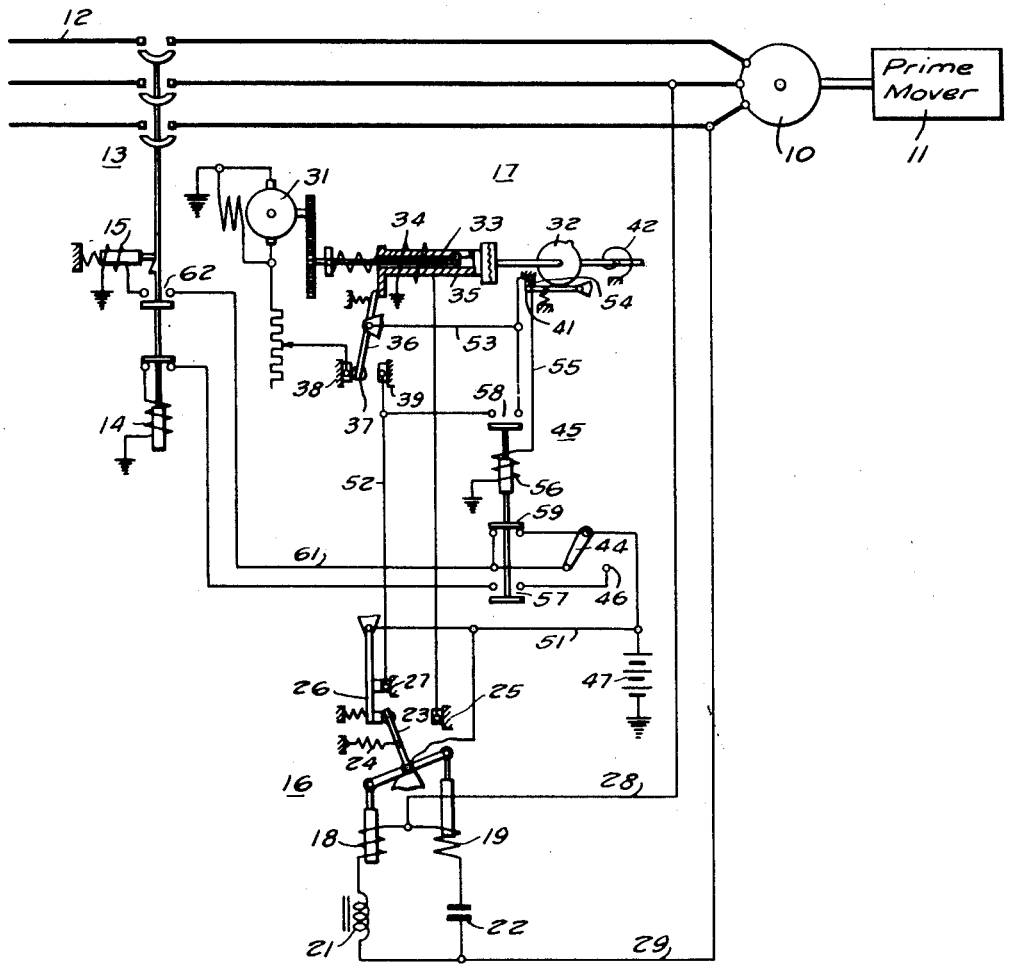
WITNESSES:
INVENTOR
Donald W. Exner.
BY
ATTORNEY Patented Mar. 21, 1950

2,500,939

UNITED STATES PATENT OFFICE 2,500,939

PROTECTIVE SYSTEM

Donald W. Exner, Lima, Ohio, assignor to Westinghouse Electric Corporation, East Pittsburgh, Pa., a corporation of Pennsylvania Application April 16, 1945, Serial No. 588,469

7 Claims. (Cl. 175—294)

My invention relates, generally, to protective devices for electrical circuits or systems and, more particularly, to a relay and relay protective system for providing low frequency protection in alternating-current generating systems where one or more alternating-current generators are utilized in supplying power to a common load, such, for example, as the auxiliary power load of a large airplane.

Heretofore, frequency relays have been used in alternating-current systems to protect against low frequency operation. In such cases, it is usually desirable to obtain quick or instantaneous protection without appreciable time delay when the system frequency drops below an acceptable minimum or critical value. Most frequency relays, however, are to some degree also voltage responsive so that under a condition of normal frequency and low voltage, the relay may open or release, and this is objectionable in the case of many systems. Such condition usually occurs during a fault on the system. When the frequency relay is intended to function to remove the generator from the load bus or circuit when a low or sub-normal frequency condition occurs, it should not trip the connecting breaker during a fault because such operation prevents the usual fault responsive clearing devices from isolating the faulted portion of the load circuit or system. Removal of the generator by tripping its connecting breaker or contactor under such condition is also undesirable when the load is made up of motors which must then be restarted. For this reason it was formerly the practice to use a timing relay in conjunction with the frequency relay so as to always provide sufficient time for fault-clearing devices to function and remove the faulted portion of the load circuit or system. This arrangement, however, always operates with time delay regardless of the relative frequency and voltage values of the circuit or system. This is disadvantageous for the reason that under conditions of appreciable or nearly normal frequency and low voltage, it is usually desirable to delay the tripping of the connecting circuit breakers in order to give the fault-responsive devices time to function, but under a condition of low frequency and appreciable or normal voltage, it is desirable to trip the connecting breaker or breakers immediately in response to the appearance of this condition on the system.

Accordingly, my invention has been directed to the solution of this problem so as to provide a protective system or scheme which is capable of distinguishing between different frequency and voltage conditions.

The object of my invention, generally stated, is to provide a low frequency protection scheme or system for alternating-current generating systems which shall be of simple and economical construction and which shall function effectively to produce the desired control results.

A more specific object of my invention is to provide, in a system of the character described, for obtaining a substantially instantaneous response to a low frequency condition when accompanied by appreciable voltage and a delayed response to a normal frequency condition when accompanied by low voltage such as results from a load or system fault.

Another object of my invention is to provide a low frequency protective relay which inherently functions to properly distinguish between low frequency-appreciable or normal voltage, and appreciable or normal frequency-low voltage conditions of the alternating-current power system in which it is used.

A further object of my invention is to provide a relay of the character described which utlizes a magnetic structure having two elements whose respective torques are oppositely directed and so designed that, at a predetermined frequency, the resultant difference torque is zero, and at higher and lower frequencies, the resultant difference torques are in opposite directions.

Another object of my invention is to provide a relay of the character described wherein the low frequency contact-making element is spring-biased so that it is operated to either an open or closed position, as the case may be, when the relay develops appreciable reverse or negative torque due to a low frequency-appreciable voltage condition.

A still further object of my invention is to provide a low frequency protective system for an alternating-current power system wherein a frequency responsive relay is used in conjunction with a timing relay to effect substantially instantaneous tripping of the connecting circuit breaker under a low frequency-appreciable voltage condition and delayed tripping under an appreciable frequency-low voltage condition.

These and other objects of my invention will become more apparent from the following detailed description when read in conjunction with the drawing, in which the single figure is a diagrammatic view of a low frequency protective system embodying the principal features of my invention.

Referring to the drawing, there is shown an alternating-current generator 10 driven by a suitable prime mover 11 for supplying power to a load circuit or bus represented by conductor 12. The generator is connected to the load circuit 12 through a suitable circuit breaker 13 provided with a closing means 14 and a tripping means 15.

While only one generator and its associated breaker have been shown, it is to be understood that my low frequency protective system may be used with each generator of a number of generators operating in parallel to supply a common load. A system of this kind is disclosed in my copending application, Serial No. 510,137, filed November 13, 1943, now Patent No. 2,392,469, and assigned to the assignee of this application. In that system, provision is made for selecting one or all of the generators for operation, and they are connected and disconnected from the common load in accordance with the amount of load to be supplied.

My protective system comprises, generally, a frequency-responsive relay 16 and a time-delay relay 17 operating in conjunction to provide the desired results in controlling the operation of the connecting breaker 13. As described hereinbefore, my system functions to effect the instantaneous tripping of the circuit breaker 13 in response to a low frequency-normal voltage condition, and to effect a delayed tripping thereof in response to an appreciable frequency-low voltage condition.

In order to provide this result, the frequency relay 16, which has been shown in schematic form, is provided with a magnetic structure having two elements whose respective torques are oppositely directed. In this instance, these elements are designated by the numerals 18 and 19. These elements are so designed that at a certain critical frequency, the resultant difference torque is zero, and at a higher frequency the difference torque is in one direction, and at a lower frequency the difference torque is in the opposite direction.

This effect may be obtained in several different ways, as follows: The impedance of one element may be substantially resistive so that its torque is affected but slightly with frequency, while the impedance of the other element may be predominantly inductive so that its torque decreases as the frequency increases.

The impedance of one element may be capacitive so that its torque increases as the frequency increases, while the impedance of the other element may be substantially resistive.

The impedance of one element may be capacitive, while the impedance of the other element may be inductive. In this instance, the torque of the capacitive element increases as the frequency increases and the torque of the inductive element decreases as the frequency increases.

It is this latter arrangement that is shown in the drawing, the inductive element 21 being connected in series with the coil of the element 18 and the capacitive element 22 being connected in series with the coil of element 19 of the frequency relay 16.

It will be understood that by means of this arrangement the relay will be actuated to the position opposite to that shown, as the frequency on the system increases to its normal or above the critical value.

The frequency relay 16 is provided with a movable contact element 23 biased to the left-hand position, as shown, by a spring 24. It is provided with a stationary contact member 25 and a movable spring-biased contact member 26. The movable contact element 23 under certain conditions engages contact member 25 to establish a control circuit, which will be described hereinafter. This contact element 23 also engages the contact member 26 to actuate it from the position shown to effect the opening of contact members 27, the purpose of which will be described hereinafter.

As shown, the operating coils of the elements 18 and 19 are connected to the generator circuit through conductors 28 and 29 so that these coils are subjected to the frequency and voltage conditions appearing on the load circuit.

The time delay relay 17 may be of any suitable type. The one illustrated in this embodiment of the invention is similar to that disclosed in the copending application of C. L. Mershon, Serial No. 588,426, filed April 16, 1945, and assigned to the assignee of this application.

This device comprises, generally, a motor 31 which drives a timing disk 32 through a suitable clutch mechanism 33. The clutch mechanism 33 is provided with a control winding 34, and the moving element 35 of this mechanism actuates a control switch 36 having movable contact members 37 and stationary contact members 38 and 39. The timing disk 32 actuates a switch element 41 after a predetermined time delay as determined by the reset position of this disk. The disk and other elements of the relay are maintained in their reset position and are returned thereto when the relay is operated by means of a spring element 42.

The normal operating condition of this relay is that the clutch coil 34 is energized so that the motor is disconnected from the timing disk, and the motor circuit is opened by the switch element 36 being in its right-hand position.

Having now described the two separate elements of the system, it will now be pointed out in detail how these two elements function together to produce the desired results.

Assuming that the generator 10 is being driven by the prime mover 11 and is also supplied with a suitable voltage regulator, not shown, so as to control its output voltage, the operator may effect the connection of this generator to the load circuit 12 by actuating the manual control switch 44 into engagement with contact member 46. This partially establishes the energizing circuit from battery 47 to the closing coil 14. The connection of the generator is now under the control of the frequency relay 16.

When the voltage of the generator 10 is low as when the generator is starting, the contact element 23 of the frequency relay is in the position shown. As the speed of the generator increases, its voltage will rise to a normal value under the control of the voltage regulator, not shown, before the frequency reaches the critical setting of relay 16. As the voltage rises, the frequency being low, relay 16 will develop a strong reverse torque sufficient to open its contact members 27. This has no effect on the system at this time, however, because the circuit controlled by these contact members is already open due to the position of the control elements of the time delay relay 17.

As the frequency of the generator increases and approaches the setting of relay 16, the contact members 27 will again be closed, and as the frequency rises further to its normal value, the torque developed in the relay becomes positive, and the movable element 23 engages contact member 25.

This indicates that the generator 10 is now ready to be connected to the load circuit, and an energizing circuit is now established for the closing coil 14 of the breaker. The closure of contact members 23 and 25 energizes the operating coil 34 of clutch 33 over an obvious circuit from the battery 47. The operation of the movable element 35 actuates the switch element 36, and contact members 37 and 39 are closed. The closure of these contact members establishes an energizing circuit for the control relay 45 which extends from the battery through conductor 51, contact elements 26 and 27, conductor 52, contact members 37 and 39, conductor 53, contact members 54, conductor 55, and the operating coil 56 of relay 45.

The closure of the control relay 45 energizes the closing coil 14 of the breaker through its contact members 57 and closes a holding circuit through its contact members 58 around contact members 37 and 39 of the switch element 36. The normally closed contact members 59 open the energizing circuit from the battery to the trip coil 15 which extends through conductor 61 and contact members 62 on the breaker.

The breaker is now closed and the generator 10 connected to the load circuit supplying power thereto at normal frequency and voltage.

Assuming now that the frequency falls below the setting of the frequency relay 16, such as may result from a decrease in speed of the prime mover 11 when shutting down the generator system. Under this condition, the voltage of the generator will remain approximately normal for a short time, but the frequency will decrease rapidly. This causes the frequency relay 16 to develop a strong reverse torque which is sufficient to open contact members 27 which are closed during the normal operation of the system. Upon the opening of these contact members, the control relay 45 is immediately deenergized and released to the position shown, and the circuit breaker is tripped immediately in response to the closure of contact members 59 of the relay.

The opening of contact members 23 and 25 deenergized the clutch coil 34 and initiated the operation of the timing relay 17. This was effected by the closure of the clutch element connecting the motor to the timing disk and the closure of contact members 37 and 38 to energize the motor 31 through the closed contact members 54 and 58. It will be understood, however, that since the control relay 45 opens quickly, its contact members 58 are opened to deenergize the timing motor 31 and discontinue the timing cycle.

It will be understood that in response to this condition of the load circuit, the circuit breaker 13 has been tripped immediately in response to the selective operation of the frequency relay 16. It will now be assumed that the breaker is closed and the generator 10 supplying power in a normal manner, and that a fault or heavy overload occurs on the load circuit. Under these conditions, the frequency will remain appreciable, that is, above a critical value or setting of the relay 16, while the voltage will be decreased to below a normal value.

The voltage decrease may be of such value as to cause the frequency relay to open its contact members 23 and 25, but contact members 27 will remain closed for the reason that there is not sufficient reverse torque developed in the relay to effect their opening. When this occurs, the circuit breaker is not tripped immediately as before due to the opening of contact members 27, but instead is tripped after a predetermined time interval, as determined by the timing relay 17.

As explained hereinbefore, the opening of contact members 23 and 25 deenergizes the clutch coil 34 and initiates the operation of the timing relay. At this time, however, the control relay 45 is energized, and its contact members 58 closed so that the energizing circuit for the timing motor is completed by the closure of contact members 37 and 38 when the clutch is released. This will cause the timing relay to operate until such time as contact members 54 are opened by the timing disk which will deenergize and release the control relay 45. When this relay releases, its contact members 58 open the energizing circuit for the timing motor, and its contact members 59 close to energize the trip coil 15. Thus, the breaker is tripped open under these conditions at the expiration of a predetermined time.

It will be apparent that this timed opening of the breaker under these conditions provides the necessary time for the other protective relays or devices of the system to function to disconnect the faulted apparatus or portions of the circuit from the main part thereof.

It will be understood that when the timing motor 13 is deenergized, the relay will reset itself to a normal starting position, and that the frequency relay will also assume its normal position, such as determined by frequency and voltage conditions of the system.

In view of the foregoing description of a preferred embodiment of my invention, it will be apparent that it provides in a simple and effective manner for so controlling the connection of a generator to a load circuit that the generator will be connected and disconnected therefrom in accordance with different electrical conditions appearing on the circuit. The frequency relay arrangement of my invention so functions as to accurately distinguish between these different electrical conditions so that the generator may be immediately disconnected in the event that a low frequency-normal voltage condition exists, and disconnected after a predetermined time interval when a normal frequency-low voltage condition exists.

While I have shown and described a particular embodiment of my invention, it will be apparent that changes and modifications may be made therein without departing from the principles thereof.

I claim as my invention:

1. In an alternating-current power system, in combination, a load bus, a generator for supplying power to said bus, a circuit breaker connecting the generator to the load bus, and means including frequency and voltage responsive relay means connected in intermediate circuit relation between the breaker and generator and time-delay relay means controlled thereby selectively operable to trip the breaker substantially instantaneously in response to a low frequency-normal voltage electrical condition of the load bus and after a time delay in response to an appreciable frequency-low voltage electrical condition of the load bus.

2. In an alternating-current power system, in combination, a load circuit, an alternating-current generator for supplying power to the load circuit, a circuit breaker connecting the generator to the load circuit, a frequency and voltage responsive relay connected to the load circuit on the generator side of the breaker and operable to different positions in response to different electrical conditions of the circuit, and relay means including a time delay relay responsive to the operation of the frequency relay to its different operating positions to first effect the closure of the breaker as the generator speed is increased to normal value and to subsequently trip the breaker substantially instantaneously under one predetermined relationship between frequency and voltage of the load circuit and with time delay under a different predetermined relationship between frequency and voltage of the load circuit.

3. In an alternating current power system, in combination, a load circuit, an alternating current generator, a circuit breaker connecting the generator to the load circuit having closing and tripping means, voltage and frequency responsive relay means connected to the circuit intermediate the breaker and the generator, a control relay means operable to different circuit controlling positions and connected to said closing and tripping means for controlling the operation thereof, time delay relay means connected to said control relay means for at times controlling operation thereof, circuit means connecting the control relay means and the time delay relay means to said voltage and frequency responsive relay means to be controlled thereby, said voltage and frequency responsive relay means being effective when operated to one circuit controlling position to effect operation of the control relay means to close the circuit breaker when the generator is brought up to normal speed and being thereafter operable in response to a condition of predetermined low frequency and normal voltage of the load circuit to cause immediate operation of said control relay to effect tripping of the breaker and operable in response to a condition of predetermined low voltage and appreciable frequency to cause said time delay relay means to effect operation of said control relay after a predetermined time delay to cause tripping of the breaker.

4. In an alternating current power system, in combination, an alternating-current generator, a circuit breaker connected to said generator for connecting the generator to a load circuit, said circuit breaker having operating means, time delay relay means connected to said breaker operating means operable to cause opening of the circuit breaker, and circuit means including a voltage and frequency responsive relay means connected to said generator and operable to one position in response to a condition of predetermined low frequency and substantially normal voltage of the load circuit to effect immediate operation of said breaker operating means to open said circuit breaker and operable to a different position in response to a condition of predetermined low voltage and appreciable frequency to effect operation of said time delay relay means to cause opening of said circuit breaker after a predetermined time delay.

5. In an alternating current power system, in combination, a circuit breaker connected to the generator for connecting said generator to a load circuit, said circuit breaker having operating means, time delay relay means having contact members connected to said breaker operating means operable to cause the opening of the breaker, and circuit means including a voltage and frequency responsive relay means connected to control the operation of breaker operating means and the time delay relay means, said voltage and frequency responsive relay having voltage and frequency responsive operating elements connected to the generator and being operable to one circuit controlling position in response to a condition of predetermined low frequency and substantially normal voltage of the load circuit to effect an immediate operation of the breaker operating means to effect an immediate opening of the breaker and operable to a different circuit controlling position in response to a condition of predetermined low voltage and appreciable frequency of the load circuit to initiate the operation of the time delay relay means to effect the operation of the breaker operating means and the opening of the breaker after a predetermined time delay.

6. In an alternating current power system, an alternating current generator, a circuit breaker connected to said generator for connecting the generator to a load circuit, said circuit breaker having opening and closing means, control relay means connected to said circuit breaker opening and closing means for controlling the operation of the circuit breaker, time delay relay means having a connection to said control relay means for controlling the operation thereof to effect opening of the circuit breaker, and frequency and voltage responsive relay means connected to said generator so as to be responsive to the frequency and voltage of the load circuit when said generator is connected to the load circuit, said frequency and voltage responsive relay means being connected to said control relay means and operable to one position in response to a condition of predetermined low frequency and substantially normal voltage of the load circuit to effect immediate operation of said control relay means to cause opening operation of the circuit breaker and also being connected to said time delay relay means and operable to another position in response to a condition of predetermined low voltage and appreciable frequency of the load circuit to cause said time delay relay means to effect operation of said control relay means after a predetermined time delay to effect opening of the circuit breaker.

7. In an alternating current power system, in combination, an alternating current generator, a circuit breaker connected to said generator for connecting the generator to a load circuit, said circuit breaker having opening and closing means, control relay means having contacts connected to said opening and closing means to control operation of the breaker and having an operating coil, time delay relay means having normally closed contacts connected to the operating coil of said control relay for at times controlling operation thereof and having an operating coil, and frequency and voltage responsive relay means having operating means connected to said generator and normally closed contacts connected to the operating coil of said control relay means in series circuit relation with the normally closed contacts of the time delay relay means and additional contacts connected to the coil of said time delay relay means, said frequency and voltage responsive relay means being operable to one position in response to a condition of predetermined low frequency and normal voltage of the load circuit to effect immediate operation of said control relay means to cause immediate opening of the circuit breaker and being operable to a second position in response to a condition of predetermined low voltage and appreciable frequency condition of the load circuit to cause operation of said time delay relay means to effect operation of said control relay means after a predetermined time delay to cause a delayed opening of said circuit breaker.

DONALD W. EXNER.

REFERENCES CITED

The following references are of record in the file of this patent:

UNITED STATES PATENTS

| Number | Name | Date |
|---|---|---|
| 1,335,120 | Lum | Mar. 30, 1920 |
| 1,695,885 | Crichton | Dec. 18, 1928 |
| 1,706,713 | Travers | Mar. 26, 1929 |
| 2,402,573 | Pell | June 25, 1946 |

FOREIGN PATENTS

| Number | Country | Date |
|---|---|---|
| 475,640 | Great Britain | Nov. 23, 1937 |